United States Patent
Kikuno et al.

(10) Patent No.: US 9,803,781 B2
(45) Date of Patent: Oct. 31, 2017

(54) JOINT STRUCTURE FOR METALLIC PIPES

(75) Inventors: Tomonori Kikuno, Sakai (JP); Teruo Kido, Sakai (JP); Hiroshi Yamashita, Sakai (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 1037 days.

(21) Appl. No.: 13/996,358

(22) PCT Filed: Dec. 22, 2011

(86) PCT No.: PCT/JP2011/007235
§ 371 (c)(1),
(2), (4) Date: Jun. 20, 2013

(87) PCT Pub. No.: WO2012/090461
PCT Pub. Date: Jul. 5, 2012

(65) Prior Publication Data
US 2013/0319569 A1    Dec. 5, 2013

(30) Foreign Application Priority Data
Dec. 28, 2010    (JP) .................................. 2010-293301

(51) Int. Cl.
*F16L 13/08*    (2006.01)
*F16L 13/007*    (2006.01)
(Continued)

(52) U.S. Cl.
CPC .............. *F16L 13/08* (2013.01); *B23K 1/002* (2013.01); *B23K 1/0012* (2013.01);
(Continued)

(58) Field of Classification Search
CPC combination set(s) only.
See application file for complete search history.

(56) References Cited

U.S. PATENT DOCUMENTS 3,704,901 A * 12/1972 Borner ................... F16L 13/007
285/148.12
3,750,248 A * 8/1973 Morris ................. B21D 53/085
228/154

(Continued)

FOREIGN PATENT DOCUMENTS

CN    101161395 A    4/2008
JP    4-83844 A    3/1992
(Continued)

OTHER PUBLICATIONS

International search report issued in PCT/JP2011/007235 mailed Apr. 3, 2012.
(Continued)

*Primary Examiner* — James M Hewitt
(74) *Attorney, Agent, or Firm* — Birch, Stewart, Kolasch & Birch, LLP (57) ABSTRACT

One of a first metallic pipe containing a first metal as a main component and a second metallic pipe containing a second metal as a main component includes an expanded-diameter connecting part which is formed at an end part of the one metallic pipe. An inner diameter of the end part is greater than an inner diameter of an adjacent part that is adjacent to the end part. An intermetallic compound layer of the first and second metal is present at an interface of the first and second metal located between a brazing filler metal and the one or the other of the metallic pipes. A thickness of the intermetallic compound layer is configured such that the thickness of an end portion on the side of a base end is smaller than the thickness of an end portion on the side of an open end.

6 Claims, 8 Drawing Sheets

(51) Int. Cl.
 B23K 1/00    (2006.01)
 B23K 1/002   (2006.01)
 B23K 1/005   (2006.01)
 B23K 1/18    (2006.01)
 B23K 1/19    (2006.01)
 B23K 1/20    (2006.01)
 B23K 101/06  (2006.01)
 B23K 101/14  (2006.01)
 B23K 103/10  (2006.01)
 B23K 103/12  (2006.01)
 B23K 103/18  (2006.01)
 F16L 9/02    (2006.01)

(52) U.S. Cl.
 CPC .............. *B23K 1/0056* (2013.01); *B23K 1/18* (2013.01); *B23K 1/19* (2013.01); *B23K 1/203* (2013.01); *F16L 13/007* (2013.01); *B23K 2201/06* (2013.01); *B23K 2201/14* (2013.01); *B23K 2203/10* (2013.01); *B23K 2203/12* (2013.01); *B23K 2203/18* (2013.01); *F16L 9/02* (2013.01)

(56) References Cited

U.S. PATENT DOCUMENTS

| | | | | |
|---|---|---|---|---|
| 3,830,262 A | * | 8/1974 | Lago | F16L 13/08 138/109 |
| 3,855,679 A | * | 12/1974 | Schmatz | B23K 1/19 228/209 |
| 5,338,072 A | * | 8/1994 | Bitter | F16L 13/08 228/198 |
| 5,464,146 A | * | 11/1995 | Zaluzec | B23K 1/0012 228/197 |
| 6,164,517 A | | 12/2000 | Kim | |
| 2005/0029333 A1 | * | 2/2005 | Koyama | B23K 1/19 228/245 |
| 2009/0212025 A1 | * | 8/2009 | Zuo | B23K 11/002 219/61.7 |
| 2011/0220237 A1 | * | 9/2011 | Okamoto | B21C 1/22 138/140 |
| 2013/0315659 A1 | * | 11/2013 | Kumar | B23K 35/3033 403/272 |

FOREIGN PATENT DOCUMENTS

| | | |
|---|---|---|
| JP | 8-267228 A | 10/1996 |
| JP | 9-182979 A | 10/1996 |
| JP | 2000-79463 A | 3/2000 |
| JP | 2000-117484 A | 4/2000 |
| JP | 2001-334371 A | 12/2001 |

OTHER PUBLICATIONS

Extended European Search Report dated Jun. 16, 2017 in corresponding European Patent Application No. 11853895.8.

* cited by examiner

JOINT STRUCTURE FOR METALLIC PIPES

TECHNICAL FIELD

The present invention relates to a joint structure for metallic pipes.

BACKGROUND ART

Conventionally, various techniques have been proposed as joint structures for metallic pipes to be used in a heat exchanger or the like. For example, a joint portion between metallic pipes requires pressure resistance to withstand pressure of a refrigerant and thermal shock resistance to withstand thermal shock attributable to refrigerant temperature.

Patent Document 1 discloses a method of joining a copper pipe and an aluminum pipe with each other by flash-butt welding. In addition, Patent Document 2 discloses a method of joining a copper pipe and an aluminum pipe with each other by eutectic bonding. However, performances of these joining methods are not necessarily sufficient in terms of pressure resistance and thermal shock resistance due to small joint areas between pipes.

In addition, when joining different metals such as a copper pipe and an aluminum pipe with each other, an intermetallic compound layer of these metals is produced at an interface of aluminum and copper. Since this intermetallic compound is fragile, an increase in production of the intermetallic compound results in a decrease in strength of the portion.

Patent Document 3 discloses a method of joining a copper pipe and an aluminum pipe by brazing via a plated stainless-steel joint. Patent Document 3 describes that even if a certain amount of an intermetallic compound is produced at a joint interface between different metals, strength of stainless steel offsets the decrease in strength due to the intermetallic compound. As a result, a joint structure as a whole becomes less deformable and strength thereof increases.

However, with the joint structure described in Patent Document 3, the necessity of using a stainless-steel joint increases cost. In addition, plating applied to the joint further increases cost.

Patent Document 1: Japanese Patent Application Laid-open No. H9-182979
Patent Document 2: Japanese Patent Application Laid-open No. 2001-334371
Patent Document 3: Japanese Patent Application Laid-open No. H8-267228

SUMMARY OF THE INVENTION

An object of the present invention is to provide a joint structure for metallic pipes which is capable of suppressing cost increase while suppressing a deterioration in reliability of a joint portion between the metallic pipes.

A joint structure for metallic pipes according to the present invention includes: a first metallic pipe (11) containing a first metal (M1) as a main component; and a second metallic pipe (12) containing a second metal (M2) which differs from the first metal (M1) as a main component. One of the two metallic pipes includes an expanded-diameter connecting part (13) which is formed at an end part of the one metallic pipe, an inner diameter of the end part is greater than an inner diameter of an adjacent part (16) that is adjacent to the end part. The other metallic pipe is inserted into the expanded-diameter connecting part (13) from an open end (13a) thereof toward a base end (13b) of the expanded-diameter connecting part (13), and a brazing filler metal (14) containing the first metal (M1) or the second metal (M2) as a main component is interposed between an outer surface of the other metallic pipe and an inner surface of the expanded-diameter connecting part (13). An intermetallic compound layer (15) of the first metal (M1) and the second metal (M2) is present at an interface of the first metal (M1) and the second metal (M2) located between the brazing filler metal (14) and the one or the other of the metallic pipes. A thickness of the intermetallic compound layer (15) is configured such that the thickness of an end portion (15b) on the side of the base end (13b) is smaller than the thickness of an end portion (15a) on the side of the open end (13a).

DESCRIPTION OF EMBODIMENTS

Hereinafter, a joint structure 10 for metallic pipes according to an embodiment of the present invention will be described in detail with reference to the drawings. First, a heat exchanger having the joint structure 10 for metallic pipes will be described.

<Heat Exchanger>

Figure 1:
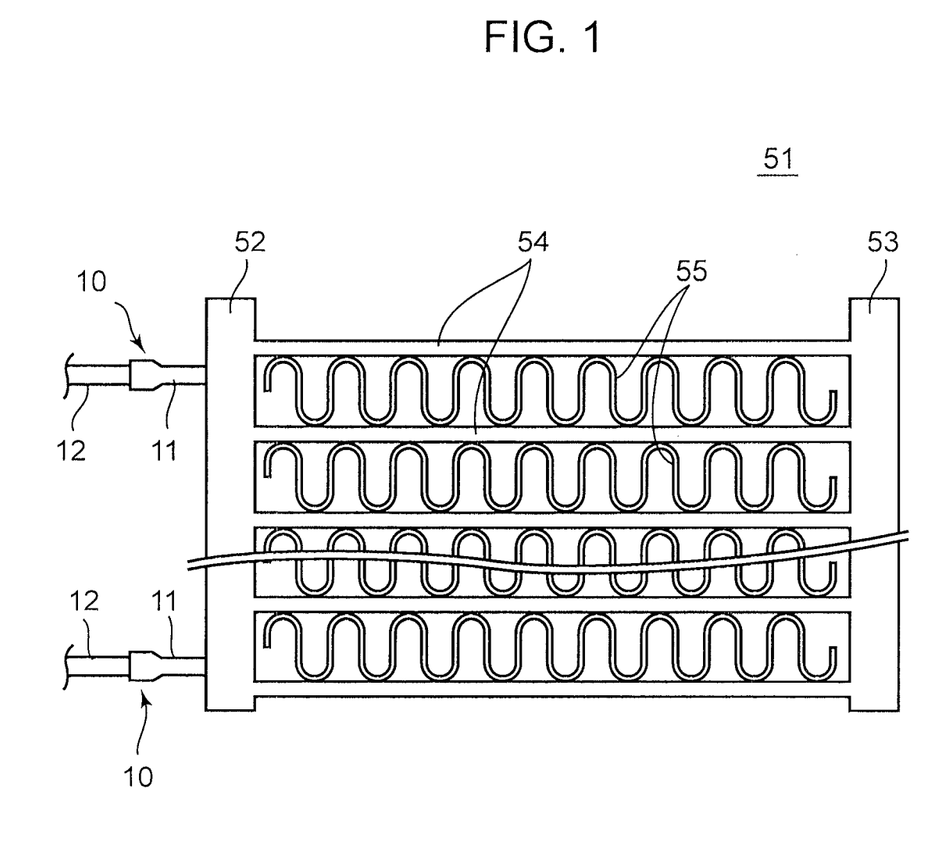
FIG. 1 is a schematic view showing a heat exchanger having a joint structure for metallic pipes according to an embodiment of the present invention.

A heat exchanger 51 shown in FIG. 1 can be used as an evaporator, a condenser of an air conditioning device, or the like. The heat exchanger 51 is, for example, a heat exchanger including a refrigerant flow channel with a small inner diameter or, in other words, a so-called microchannel heat exchanger.

The heat exchanger 51 includes headers 52 and 53, a plurality of flat heat-transfer pipes 54, a plurality of fins 55, and the joint structure 10. First metallic pipes 11 containing a first metal M1 as a main component are respectively connected to upper and lower portions of the header 52. Each first metallic pipe 11 is jointed to a second metallic pipe 12 containing a second metal M2 as a main component. The joint structure 10 will be described later.

A metallic pipe such as a multi-hole pipe can be used as each heat-transfer pipe 54. The plurality of flat heat-transfer pipes 54 is arranged parallel to each other. A longitudinal direction of each heat-transfer pipe 54 is perpendicular to a direction of air flow. Each fin 55 is, for example, a metal plate bent in a wave-like shape and is arranged between the flat heat-transfer pipes 54. A thickness direction of the fin 55 is perpendicular to the direction of air flow.

For example, a refrigerant having flowed into the header 52 via the upper second metallic pipe 12 and the upper first metallic pipe 11 diverges from the header 52 into the plurality of flat heat-transfer pipes 54 or sequentially flows through the plurality of flat heat-transfer pipes 54. The refrigerant flowing through the plurality of flat heat-transfer pipes 54 merges at the header 53. The merged refrigerant flows from the header 53 into another plurality of flat heat-transfer pipes 54. The refrigerant flowing through these flat heat-transfer pipes 54 eventually flow outs from the heat exchanger 51 via the first metallic pipe 11 connected to the lower portion of the header 52.

<Joint Structure for Metallic Pipes>

Figure 2A:
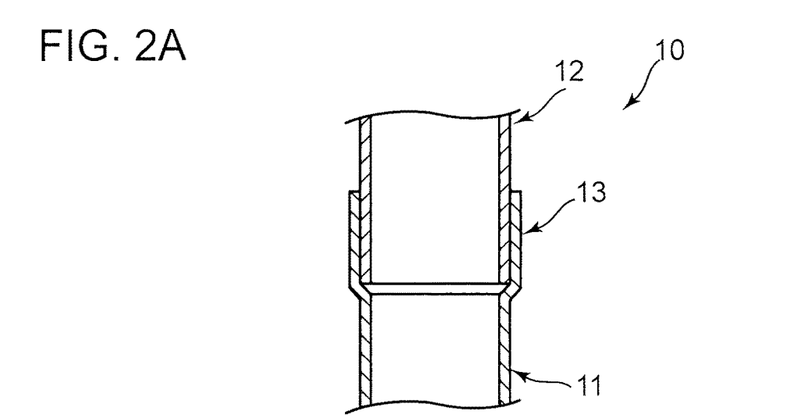
FIG. 2A is a sectional view showing a joint structure for metallic pipes according to the embodiment of the present invention.
Figure 2B:
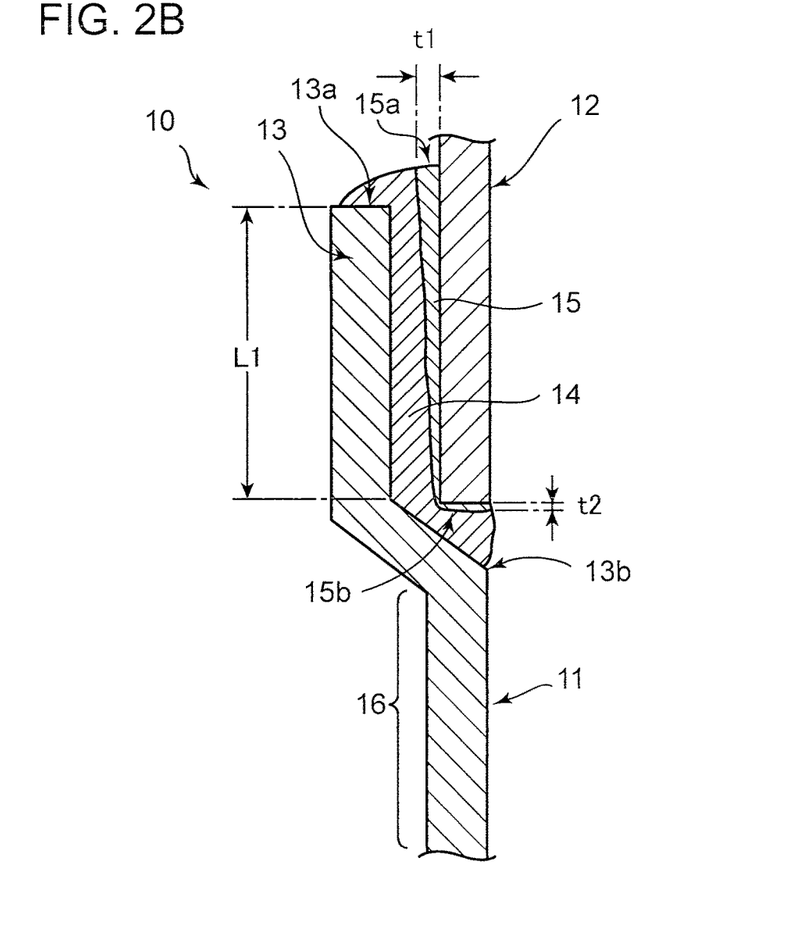
FIG. 2B is a sectional view showing an enlargement of a substantial part of the joint structure for metallic pipes.

FIG. 2A is a sectional view showing the joint structure 10 for metallic pipes according to the embodiment of the present invention, and FIG. 2B is a sectional view showing an enlargement of a substantial part of the joint structure 10. In the present embodiment, an example where the first metal M1 is aluminum or an aluminum alloy and the second metal M2 is copper or a copper alloy will be described. An aluminum pipe 11 as the first metallic pipe is made of aluminum or an aluminum alloy, and a copper pipe 12 as the second metallic pipe is made of copper or a copper alloy. The aluminum pipe 11 and the copper pipe 12 are joined to each other by a brazing filler metal 14.

The aluminum pipe 11 has an expanded-diameter connecting part 13 that is used to connect to the copper pipe 12. The expanded-diameter connecting part 13 is formed at an end part of the aluminum pipe 11. An inner diameter of the expanded-diameter connecting part 13 is greater than an inner diameter of an adjacent part 16 that is adjacent to the expanded-diameter connecting part 13. The copper pipe 12 is inserted into an open end 13a of the expanded-diameter connecting part 13 toward a base end 13b of the expanded-diameter connecting part 13. The base end 13b refers to a boundary portion between the expanded-diameter connecting part 13 and the adjacent part 16 and is a portion whose inner diameter changes.

The expanded-diameter connecting part 13 is formed by flaring the end part of the aluminum pipe 11. Although sizes of the aluminum pipe 11 and the copper pipe 12 are not particularly limited, one example is as follows. An inner diameter of the adjacent part 16 of the aluminum pipe 11 and an inner diameter of the copper pipe 12 are set approximately equal to each other in order to reduce resistance when a refrigerant flows through these tubes. In addition, an outer diameter of the adjacent part 16 of the aluminum pipe 11 is set greater than an outer diameter of the copper pipe 12 in consideration of pressure resistance.

Furthermore, an example of respective dimensions when the copper pipe 12 has a size equal to or greater than that of an ⅛ inch pipe (outer diameter 3.17 mm) is as follows. A depth of the expanded-diameter connecting part 13 or, in other words, a vertical length L1 of an inner circumferential surface of the expanded-diameter connecting part 13 is favorably 5 mm or more in consideration of increasing a joint area between the pipes. An inner diameter of a region of the expanded-diameter connecting part 13 which opposes the copper pipe 12 is favorably around 0.1 mm to 0.6 mm greater than the outer diameter of the copper pipe 12. Accordingly, a gap into which the brazing filler metal 14 flows can be secured.

As shown in FIG. 2B, the brazing filler metal 14 is interposed between an outer surface of the copper pipe 12 and an inner surface of the expanded-diameter connecting part 13. In this case, the outer surface of the copper pipe 12 includes an outer circumferential surface (outside surface) of the copper pipe 12 and a tip surface (lower end surface) of the copper pipe 12. The inner surface of the expanded-diameter connecting part 13 includes an inner circumferential surface (inside surface) of the expanded-diameter connecting part 13, an uneven surface of the expanded-diameter connecting part 13 which opposes the tip surface of the copper pipe 12, and a tip surface (an end surface on the side of the open end 13a) of the expanded-diameter connecting part 13. The uneven surface refers to an inclined surface which connects the inner circumferential surface of the expanded-diameter connecting part 13 and an inner circumferential surface of the adjacent part 16 to each other.

In the embodiment shown in FIG. 2B, the brazing filler metal 14 is placed so as to cover approximately an entire region of the inner surface (the inner circumferential surface and the uneven surface) of the expanded-diameter connecting part 13. A brazing filler metal containing the first metal M1 or the second metal M2 as a main component can be used as the brazing filler metal 14. In the present embodiment, an example will be described in which a brazing filler metal containing aluminum as a main component or, more specifically, an aluminum-silicon brazing filler metal (Al—Si brazing filler metal) is used.

An intermetallic compound layer 15 of aluminum and copper is present at an interface of aluminum and copper located between the brazing filler metal 14 and the copper pipe 12. The intermetallic compound layer 15 is formed over approximately an entire region in which the brazing filler metal 14 and the outer surface (the outer circumferential surface and the tip surface) of the copper pipe 12 oppose each other. Therefore, in a direction in which the metallic pipes 11 and 12 extend, both end portions 15a and 15b of the intermetallic compound layer 15 are respectively positioned in a vicinity of the open end 13a and a vicinity of the base end 13b of the expanded-diameter connecting part 13.

Since the intermetallic compound layer 15 of aluminum and copper is fragile (hard and brittle), a thickness of the intermetallic compound layer 15 is favorably small. The intermetallic compound layer 15 is a reaction layer that is produced by a reaction between aluminum and copper at an interface of the aluminum and the copper when the aluminum and the copper are subjected to high temperature during brazing of the metallic pipes 11 and 12. Production of the intermetallic compound layer 15 is affected by brazing temperature and a period of time over which the brazing filler metal 14 is melted, and is particularly affected by brazing temperature. In addition, since inner diameters of the expanded-diameter connecting part 13 and the adjacent part 16 differ from each other, stress concentration is likely to occur at the base end 13b of the expanded-diameter connecting part 13 which is a boundary portion of the expanded-diameter connecting part 13 and the adjacent part 16.

In consideration thereof, in the present embodiment, a thickness t2 of the end portion 15b of the intermetallic compound layer 15 which is positioned on the side of the base end 13b is set smaller than a thickness t1 of the end portion 15a of the intermetallic compound layer 15 which is positioned on the side of the open end 13a. Accordingly, even if stress concentration occurs at the base end 13b of the expanded-diameter connecting part 13, since the thickness t2 of the end portion 15b of the intermetallic compound layer 15 on the side of the base end 13b is smaller than the thickness t1, a deterioration in resistance to the stress concentration (in particular, peeling strength) can be suppressed.

In the case of the mode shown in FIG. 2B, since a lower end portion of the brazing filler metal 14 extends to the base end 13b of the expanded-diameter connecting part 13, the thickness t2 is a dimension in a vertical direction (a longitudinal direction of the aluminum pipe 11) of the intermetallic compound layer 15 formed between a lower surface of the copper pipe 12 and the brazing filler metal 14. In addition, the thickness of the intermetallic compound layer 15 gradually decreases as extending from the end portion 15a on the side of the open end 13a toward the end portion 15b on the side of the base end 13b.

Figure 3:
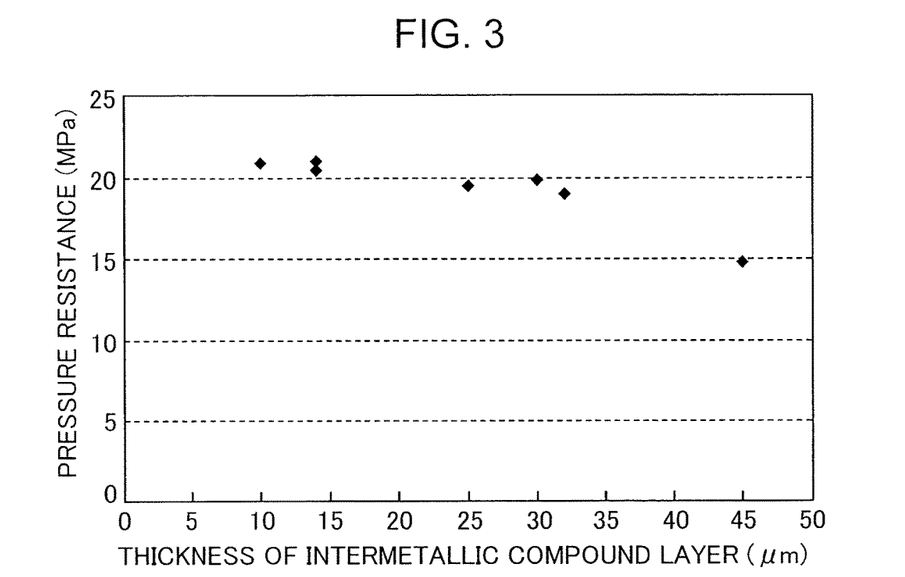
FIG. 3 is a graph showing a relationship between thickness of an intermetallic compound layer and pressure resistance.

Furthermore, durability (in particular, peeling strength) of the joint structure 10 is also affected by a maximum thickness of the intermetallic compound layer 15. FIG. 3 is a graph showing a relationship between maximum thickness of the intermetallic compound layer 15 and pressure resistance. The graph shows a result of a measurement of pressure resistance on samples respectively prepared by varying the maximum thickness of the intermetallic compound layer 15 between 10 μm and 45 μm.

As is apparent from the graph shown in FIG. 3, pressure resistance tends to decrease as the maximum thickness of the intermetallic compound layer 15 increases. Based on data represented by the graph, the maximum thickness of the intermetallic compound layer 15 can be set so as to satisfy various criteria such as that of KHK (The High Pressure Gas Safety Institute). As a specific example, a maximum allowable thickness of the intermetallic compound layer 15 is determined based on a criterion that is deemed necessary (for example, a lowest criterion) among various criteria and on a graph representing data so as to satisfy the necessary criterion. The maximum thickness of the intermetallic compound layer 15 in the present embodiment is favorably 75 μm or less (this favorable numerical value range is determined by extrapolating the data represented by the graph shown in FIG. 3). In addition, the thickness t2 of the end portion 15b of the intermetallic compound layer 15 which is positioned on the side of the base end 13b is favorably 45 μm or less. The maximum thickness of the intermetallic compound layer 15 is more favorably 50 μm or less in order to further increase pressure resistance.

(Manufacturing Method)

Next, a method of manufacturing the joint structure 10 of the metallic pipes will be described. In the present embodiment, high-frequency heating (induction heating) is used as heating means in a joining step in which the aluminum pipe 11 and the copper pipe 12 are joined with each other.

Figure 4A:
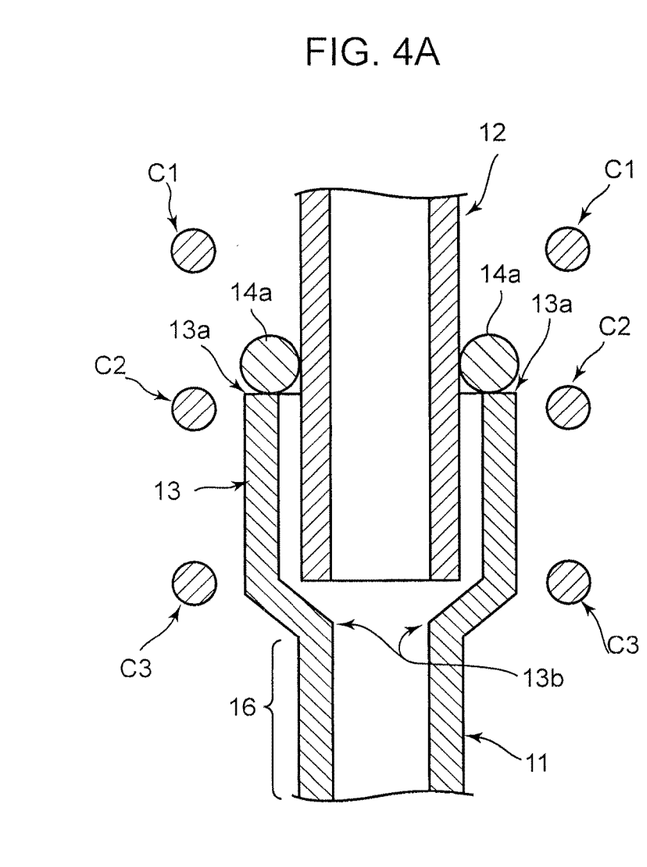
FIGS. 4A and 4B are sectional views showing a method of manufacturing the joint structure for metallic pipes.

First, the aluminum pipe 11 in which the expanded-diameter connecting part 13 is formed by flaring or the like and the copper pipe 12 are arranged at predetermined positions to be fixed and positioned by supporting members (not shown). Specifically, as shown in FIG. 4A, the aluminum pipe 11 is arranged so that the longitudinal direction of the aluminum pipe 11 is oriented in the vertical direction and the open end 13a of the expanded-diameter connecting part 13 is opened to above. The longitudinal direction of the copper pipe 12 is oriented in the vertical direction, and an end part of the copper pipe 12 is inserted into the expanded-diameter connecting part 13 from the open end 13a.

A ringed brazing filler metal 14a is arranged on an upper surface of the open end 13a of the expanded-diameter connecting part 13. An amount of the ringed brazing filler metal 14a is appropriately adjusted according to a size of space between the inner surface of the expanded-diameter connecting part 13 and the outer surface of the copper pipe 12.

Flux is favorably applied in advance to the outer surface of the end part of the copper pipe 12 to be inserted into the expanded-diameter connecting part 13 in order to increase wettability between the ringed brazing filler metal 14a containing aluminum as a main component and the copper pipe 12. Accordingly, the melted ringed brazing filler metal 14a can flow into a gap between the inner surface of the expanded-diameter connecting part 13 and the outer surface of the copper pipe 12 in a smoother manner. Therefore, for example, the brazing filler metal 14 can be placed so as to range from the open end 13a to the base end 13b as shown in FIG. 2B. Flux may also be applied to the inner surface of the expanded-diameter connecting part 13.

Heating coils C1, C2, and C3 used for high-frequency heating are arranged around the aluminum pipe 11 and the copper pipe 12. The heating coils C1, C2, and C3 may be an integrated coil that is connected in a spiral shape or may be three separate coils. The heating coils C1, C2, and C3 are arranged in this order in the vertical direction.

The central heating coil C2 is positioned around the open end 13a of the expanded-diameter connecting part 13 and is provided in order to heat the ringed brazing filler metal 14a as well as the vicinity of the open end 13a. The heating coil C1 is positioned above the heating coil C2 and is mainly provided in order to heat a parent material (the copper pipe 12). The heating coil C3 is positioned below the heating coil C2. The heating coil C3 is positioned in the vicinity of the base end 13b of the expanded-diameter connecting part 13 and is mainly provided in order to heat the vicinity of the base end 13b of a parent material (the aluminum pipe 11).

Figure 4B:
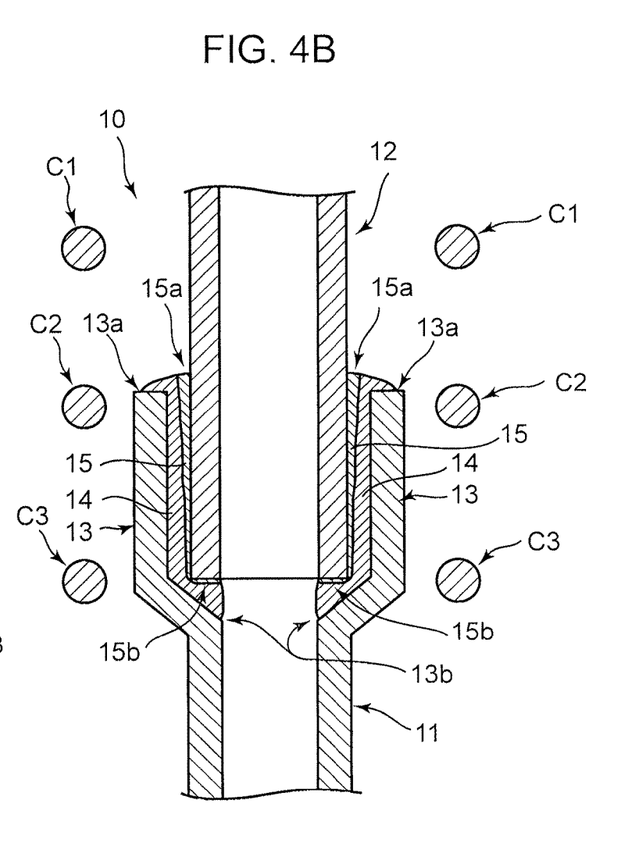

A high-frequency current is applied to the heating coils C1, C2, and C3 from a power supply (not shown) to heat the respective portions by induction. Accordingly, the ringed brazing filler metal 14a is melted, and as shown in FIG. 4B, the brazing filler metal 14a flows into the gap between the inner surface of the expanded-diameter connecting part 13 and the outer surface of the copper pipe 12. As a result, the aluminum pipe 11 and the copper pipe 12 are brazed.

A temperature T1 of the copper pipe 12 positioned radially inside the heating coil C1, a temperature T2 of the open end 13a and a vicinity thereof of the expanded-diameter connecting part 13, and a temperature T3 of the base end 13b and a vicinity thereof of the expanded-diameter connecting part 13 are adjusted so as to equal or exceed a melting point of the ringed brazing filler metal 14a but not exceed a melting point of the parent materials (the aluminum pipe 11 and the copper pipe 12) upon heating by induction. In addition, the temperatures T1, T2, and T3 are adjusted to form a temperature distribution such as that described below. That is, the temperature T3 is adjusted so as to be lower than the temperature T2. Accordingly, the thickness of the intermetallic compound layer 15 is configured such that the thickness t2 of the end portion on the side of the base end 13b is smaller than the thickness t1 of the end portion on the side of the open end 13a. While the temperature T1 may be set to a similar level as the temperature T2, since the temperature T1 is used to supplementarily heat the copper pipe 12, the temperature T1 may alternatively be adjusted so as to be lower than the temperature T2.

In addition, by using high-frequency heating as the heating means, the respective portions can be locally heated so that temperatures of the respective portions can be individually adjusted as described above. Furthermore, since high-frequency heating can be locally applied, temperatures of the respective portions can be both raised and lowered in a short period of time. In other words, since a steep thermal cycle can be realized, superfluous heat input to the metallic pipes 11 and 12 and the brazing filler metal 14 can be avoided. As a result, production of the intermetallic compound layer 15 can be suppressed. In addition, retention times for which the respective temperatures T1, T2, and T3 are retained after temperature rise are set in advance so as to allow the melted ringed brazing filler metal 14a to flow to a predetermined position (for example, the base end 13b).

Moreover, while a case where high-frequency heating is used as the heating means has been exemplified in the description above, the heating means is not limited to high-frequency heating. For example, a laser can be used as the heating means in place of high-frequency heating. Even when a laser is used, heat can be applied locally and temperatures of the respective portions can be individually adjusted in a similar manner to high-frequency heating.

For example, a lamp-pumped YAG laser, a diode-pumped YAG laser, or a $CO_2$ laser can be used as the laser. Even when heating with a laser, temperatures of the respective portions are favorably adjusted to the temperatures T1, T2, T3 or the like as described above. These temperatures can be adjusted by, for example, adjusting laser output.

(First Modification)

Figure 5:
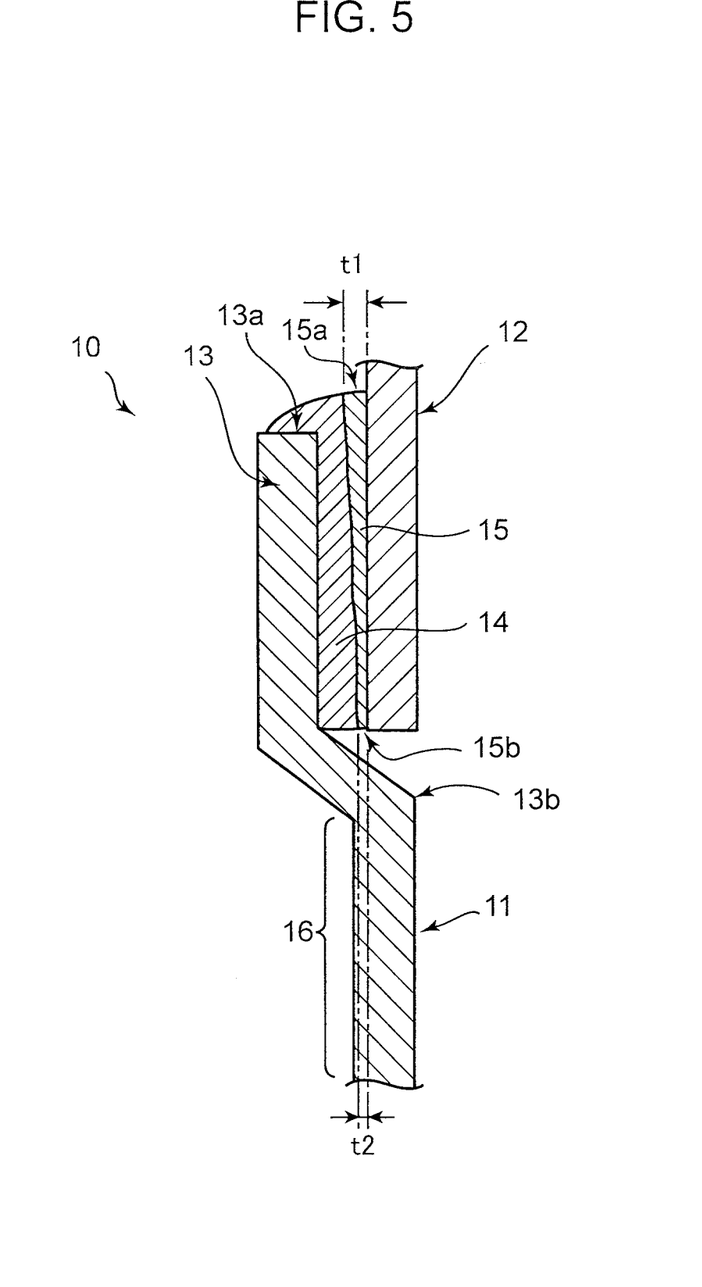
FIG. 5 is a sectional view showing an enlargement of a substantial part of a first modification of the joint structure for metallic pipes.

FIG. 5 is a sectional view showing an enlargement of a substantial part of a first modification of the joint structure 10 for metallic pipes. The joint structure 10 according to the present first modification differs from the mode shown in FIG. 2B in that the lower end portion of the brazing filler metal 14 is positioned in a position before the base end 13b (a position on the side of the open end 13a).

The brazing filler metal 14 is interposed between the outer circumferential surface of the copper pipe 12 and the inner circumferential surface of the expanded-diameter connecting part 13 and is not interposed between the tip surface of the copper pipe 12 and the uneven surface of the expanded-diameter connecting part 13. The lower end portion of the brazing filler metal 14 is at approximately a same height as the lower end part of the copper pipe 12. The position of the lower end portion of the brazing filler metal 14 can be adjusted by, for example, adjusting a region of the outer surface of the copper pipe 12 to which the flux described above is applied.

In the present first modification, a thickness t2 of the end portion 15b of the intermetallic compound layer 15 which is positioned on the side of the base end 13b is set smaller than a thickness t1 of the end portion 15a of the intermetallic compound layer 15 which is positioned on the side of the open end 13a in a similar manner to described earlier. In the case of the present first modification, as shown in FIG. 5, the thickness t2 of the end portion 15b of the intermetallic compound layer 15 which is positioned on the side of the base end 13b is equal to a dimension of the intermetallic compound layer 15 in the horizontal direction (thickness direction of the copper pipe 12).

(Second Modification)

Figure 6A:
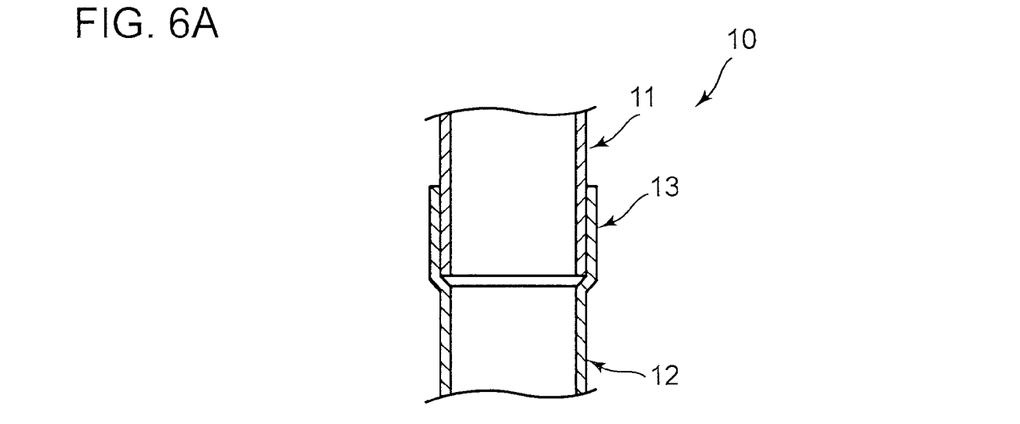
FIG. 6A is a sectional view showing a second modification of the joint structure for metallic pipes.
Figure 6B:
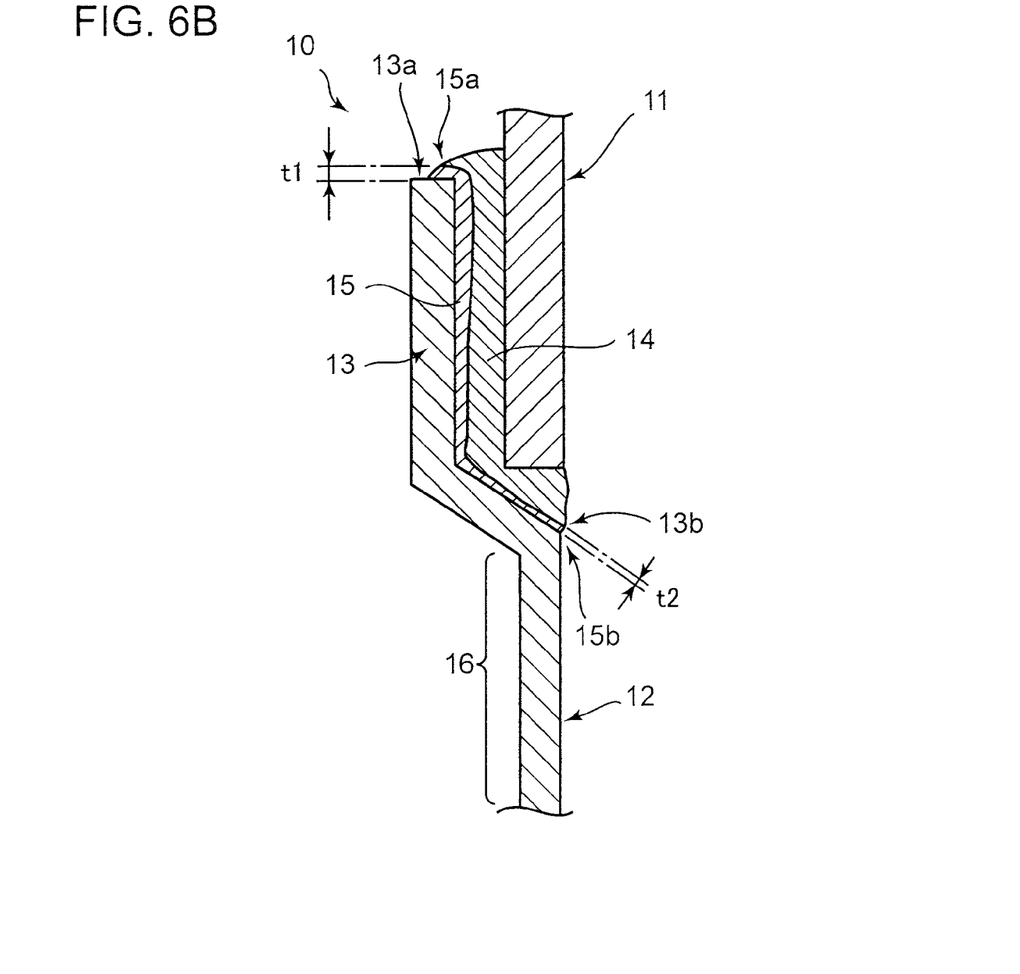
FIG. 6B is a sectional view showing an enlargement of a substantial part of the second modification.

FIG. 6A is a sectional view showing a second modification of the joint structure 10 for metallic pipes, and FIG. 6B is a sectional view showing an enlargement of a substantial part of the second modification. As shown in FIGS. 6A and 6B, the joint structure 10 according to the present second modification differs from the mode shown in FIG. 2B in that the copper pipe 12 has an expanded-diameter connecting part 13.

In the present second modification, a brazing filler metal containing aluminum as a main component such as an aluminum-silicon brazing filler metal is used as the brazing filler metal 14 in a similar manner to the description above. Therefore, an intermetallic compound layer 15 of aluminum and copper is present at an interface of aluminum and copper located between the brazing filler metal 14 and the copper pipe 12.

The intermetallic compound layer 15 is formed over approximately an entire region in which the brazing filler metal 14 and an inner surface of the expanded-diameter connecting part 13 of the copper pipe 12 oppose each other. Therefore, in a direction in which the metallic pipes 11 and 12 extend (vertical direction), both end portions 15a and 15b of the intermetallic compound layer 15 are respectively positioned in a vicinity of the open end 13a and a vicinity of the base end 13b of the expanded-diameter connecting part 13. The end portion 15a of the intermetallic compound layer 15 on the side of the open end 13a is positioned between a tip surface of the expanded-diameter connecting part 13 and the brazing filler metal 14. The end portion 15b of the intermetallic compound layer 15 on the side of the base end 13b is positioned between an uneven surface of the expanded-diameter connecting part 13 and the brazing filler metal 14.

A thickness t2 of the end portion 15b of the intermetallic compound layer 15 which is positioned on the side of the base end 13b is smaller than a thickness t1 of the end portion 15a of the intermetallic compound layer 15 which is positioned on the side of the open end 13a. As shown in FIG. 6B, in the case of the present second modification, since an upper end portion of the brazing filler metal 14 partially covers a tip surface (upper surface) of the open end 13a of the expanded-diameter connecting part 13, the thickness t1 is equal to a dimension in the vertical direction of the intermetallic compound layer 15 formed between the tip surface of the open end 13a and the brazing filler metal 14. In addition, since a lower end portion of the brazing filler metal 14 extends to the base end 13b of the expanded-diameter connecting part 13, the thickness t2 is equal to a thickness of the intermetallic compound layer 15 formed between the uneven surface of the expanded-diameter connecting part 13 and the brazing filler metal 14 at the base end 13b.

(Third Modification)

Figure 7A:
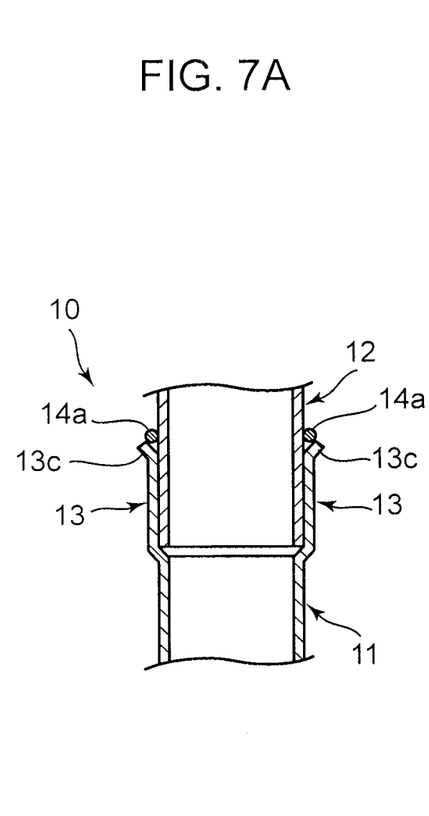
FIG. 7A is a sectional view showing a third modification of the joint structure for metallic pipes.

FIG. 7A is a sectional view showing a third modification of the joint structure 10 of the metallic pipes. The joint structure 10 according to the present third modification differs from the mode shown in FIG. 2A in that the upper end portion of the expanded-diameter connecting part 13 is further provided with a flared portion 13c. In the present third modification, in a similar manner to the mode shown in FIG. 2A, a thickness t2 of the end portion 15b of the intermetallic compound layer 15 which is positioned on the side of the base end 13b is smaller than a thickness t1 of the end portion 15a of the intermetallic compound layer 15 which is positioned on the side of the open end 13a.

The flared portion 13c according to the present third modification inclines and spreads obliquely upward with respect to a direction in which the aluminum pipe 11 extends (vertical direction). Therefore, during brazing, the ringed brazing filler metal 14a is arranged in a stable manner between the flared portion 13c and the outer circumferential surface of the copper pipe 12. In addition, an inclined inner surface of the flared portion 13c is also responsible for guiding the melted ringed brazing filler metal 14a downward during brazing. This makes it easier for the melted ringed brazing filler metal 14a to flow into the gap between the expanded-diameter connecting part 13 and the copper pipe 12. Furthermore, due to the presence of the flared portion 13c, when performing brazing by injecting the brazing filler metal without using the ringed brazing filler metal 14a (face-fed brazing), the shape of the third modification effectively makes it easier to inject the brazing filler metal.

For example, a size to which a diameter of the flared portion 13c is expanded in a radial direction is favorably adjusted so as to approximately equal a diameter of the ringed brazing filler metal 14a. Alternatively, the flared portion 13c may spread outward in the radial direction (in the horizontal direction).

(Fourth Modification)

Figure 7B:
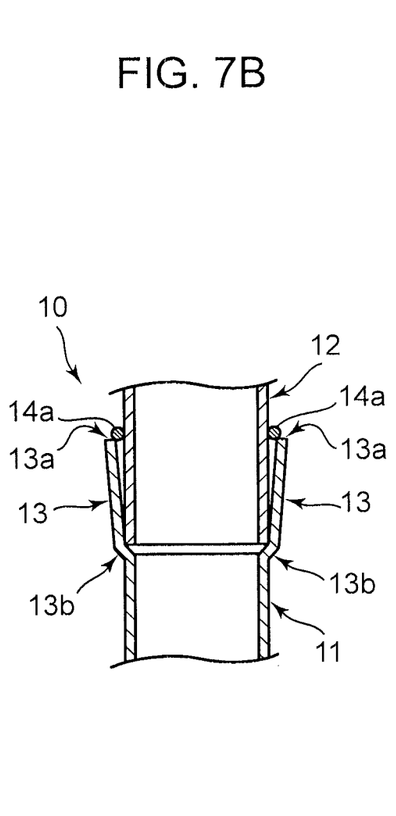
FIG. 7B is a sectional view showing a fourth modification of the joint structure for metallic pipes.

FIG. 7B is a sectional view showing a fourth modification of the joint structure 10 of the metallic pipes. The joint structure 10 according to the present fourth modification differs from the mode shown in FIG. 2A in that the expanded-diameter connecting part 13 is inclined as a whole with respect to a direction in which the aluminum pipe 11 extends.

The expanded-diameter connecting part 13 according to the present fourth modification has a tapered shape in which an inner diameter gradually decreases as extending from the open end 13a toward the base end 13b. The inclination of an inner circumferential surface of the expanded-diameter connecting part 13 makes it easier for the melted ringed brazing filler metal 14a to flow into the gap between the expanded-diameter connecting part 13 and the copper pipe 12. For example, a size of a gap between the inner circumferential surface of the expanded-diameter connecting part 13 and the outer circumferential surface of the copper pipe 12 at the open end 13a is favorably adjusted so as to approximately equal the diameter of the ringed brazing filler metal 14a. Accordingly, during brazing, the ringed brazing filler metal 14a is arranged at the upper end portion of the expanded-diameter connecting part 13 in a stable manner.

(Fifth Modification)

Figure 7C:
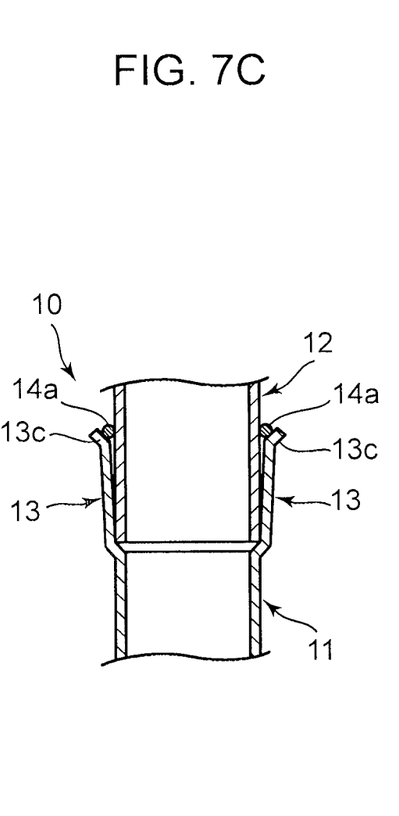
FIG. 7C is a sectional view showing a fifth modification of the joint structure for metallic pipes.

FIG. 7C is a sectional view showing a fifth modification of the joint structure 10 of the metallic pipes. The joint structure 10 according to the present fifth modification combines features of the third modification and the fourth modification. In other words, the expanded-diameter connecting part 13 according to the present fifth modification has a tapered shape in which an inner diameter gradually decreases as extending from the open end 13a toward the base end 13b. In addition, the flared portion 13c is further provided at the upper end portion of the expanded-diameter connecting part 13.

(Sixth Modification)

Figure 8A:
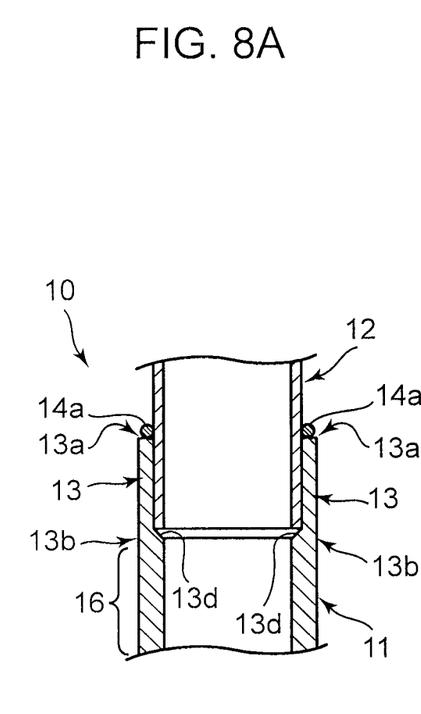
FIG. 8A is a sectional view showing a sixth modification of the joint structure for metallic pipes.

FIG. 8A is a sectional view showing a sixth modification of the joint structure 10 of the metallic pipes. The joint structure 10 according to the present sixth modification differs from the mode shown in FIG. 2A in that the expanded-diameter connecting part 13 does not have a flared shape and that the expanded-diameter connecting part 13 is formed by expanding an inner diameter of an end part of a metallic pipe using processing means such as cutting (for example, cutting by a drilling machine). In the present sixth modification, in a similar manner to the mode shown in FIG. 2A, a thickness t2 of the end portion 15b of the intermetallic compound layer 15 which is positioned on the side of the base end 13b is smaller than a thickness t1 of the end portion 15a of the intermetallic compound layer 15 which is positioned on the side of the open end 13a.

In the present sixth modification, the outer diameter of the expanded-diameter connecting part 13 is approximately the same as the outer diameter of the adjacent part 16. The expanded-diameter connecting part 13 has an approximately cylindrical shape. In the present sixth modification, since the expanded-diameter connecting part 13 and the adjacent part 16 are connected to each other without a variation in outer diameter, a degree of stress concentration to the base end 13b of the expanded-diameter connecting part 13 as well as residual stress can be reduced in comparison to a case where the expanded-diameter connecting part 13 is formed by flaring.

The inner circumferential surface of the expanded-diameter connecting part 13 is connected to the inner circumferential surface of the adjacent part 16 via the uneven surface 13d. The uneven surface 13d functions to position the copper pipe 12 in case that the lower end part of the copper pipe 12 comes into contact against the uneven surface 13d.

(Seventh Modification)

Figure 8B:
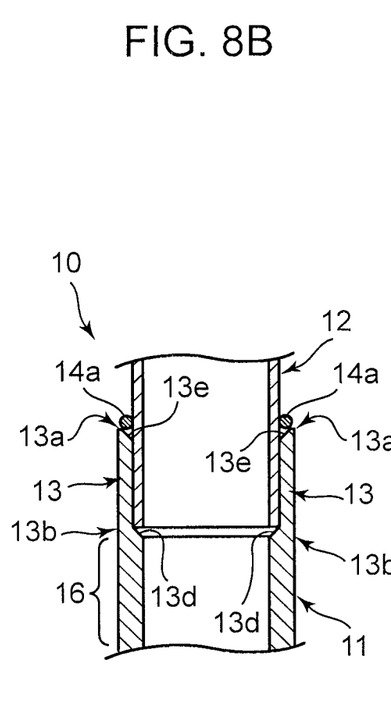
FIG. 8B is a sectional view showing a seventh modification of the joint structure for metallic pipes.

FIG. 8B is a sectional view showing a seventh modification of the joint structure 10 of the metallic pipes. The joint structure 10 according to the present seventh modification differs from the sixth modification in that a radially-inward corner portion (edge portion) 13e of the upper end portion of the expanded-diameter connecting part 13 is chamfered (by round chamfering or straight chamfering (for example, 45-degree chamfering)).

In the present seventh modification, during brazing, the ringed brazing filler metal 14a is arranged in a stable manner between the corner portion 13e and the outer circumferential surface of the copper pipe 12. In addition, an inclined inner surface of the corner portion 13e is also responsible for guiding the melted ringed brazing filler metal 14a downward during brazing. This makes it easier for the melted ringed brazing filler metal 14a to flow into the gap between the expanded-diameter connecting part 13 and the copper pipe 12. For example, a dimension of the corner portion 13e in the radial direction is favorably adjusted so as to approximately equal the diameter of the ringed brazing filler metal 14a.

(Eighth Modification)

Figure 8C:
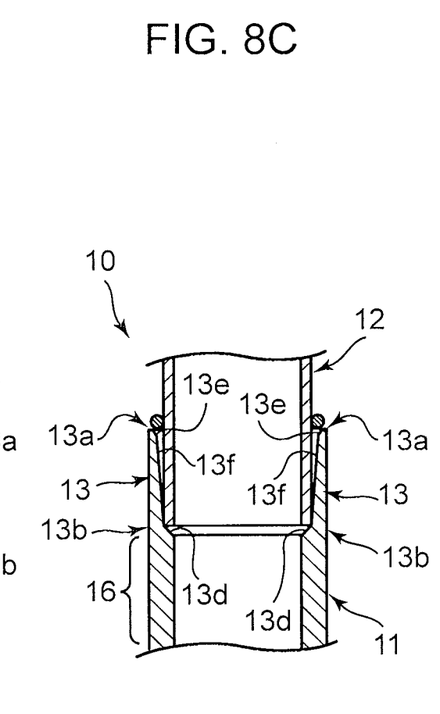
FIG. 8C is a sectional view showing an eighth modification of the joint structure for metallic pipes.

FIG. 8C is a sectional view showing an eighth modification of the joint structure 10 of the metallic pipes. The joint structure 10 according to the present eighth modification differs from the seventh modification in that the inner circumferential surface of the expanded-diameter connecting part 13 is inclined with respect to the direction in which the aluminum pipe 11 extends.

The expanded-diameter connecting part 13 according to the present eighth modification has a tapered shape in which an inner diameter gradually decreases as extending from the open end 13a toward the base end 13b. The inclination of an inner circumferential surface of the expanded-diameter connecting part 13 makes it easier for the melted ringed brazing filler metal 14a to flow into the gap between the expanded-diameter connecting part 13 and the copper pipe 12. In the present eighth modification, while the expanded-diameter connecting part 13 has a chamfered corner portion 13e that is similar to that of the seventh modification, a mode may alternatively be adopted in which the corner portion 13e is not chamfered and only has a tapered shape.

As described above, according to the present embodiment, the thickness of the intermetallic compound layer 15 is configured such that the thickness of the end portion 15b on the side of the base end 13b is smaller than the thickness of the end portion 15a on the side of the open end 13a. Since the thickness t2 of the intermetallic compound layer 15 at the end portion 15b on the side of the base end 13b is small, even if stress concentration occurs at the base end 13b of the expanded-diameter connecting part 13, a deterioration in durability due to the stress concentration is suppressed. In addition, since a deterioration in durability is suppressed by controlling the thickness of the intermetallic compound layer 15 as described above, there is no need to use a stainless-steel joint or the like as was conventional. Therefore, according to the present embodiment, a deterioration in reliability of a joint portion between metallic pipes can be suppressed while suppressing an increase in cost.

Furthermore, in the present embodiment, the thickness of the intermetallic compound layer 15 gradually decreases as extending from the end portion 15a on the side of the open end 13a toward the end portion 15b on the side of the base end 13b. In case that an abrupt variation of the thickness of the intermetallic compound layer 15 is suppressed and the thickness gradually varies from the end portion 15a on the side of the open end 13a toward the end portion 15b on the side of the base end 13b as described above, a deterioration in durability due to stress can be further suppressed.

Moreover, the specific embodiment described above mainly includes an invention configured as follows.

A joint structure for metallic pipes according to the present embodiment includes: a first metallic pipe containing a first metal as a main component and a second metallic pipe containing a second metal which differs from the first metal as a main component. One of the two metallic pipes includes an expanded-diameter connecting part which is formed at an end part of the one metallic pipe, and an inner diameter of the end part is greater than an inner diameter of an adjacent part that is adjacent to the end part. The other metallic pipe is inserted into the expanded-diameter connecting part from an open end thereof toward a base end of the expanded-diameter connecting part, and a brazing filler metal containing the first metal or the second metal as a main component is interposed between an outer surface of the other metallic pipe and an inner surface of the expanded-diameter connecting part. An intermetallic compound layer of the first metal and the second metal is present at an interface of the first metal and the second metal located between the brazing filler metal and the one or the other of the metallic pipes. A thickness of the intermetallic compound layer is configured such that the thickness of an end portion on the side of the base end is smaller than the thickness of an end portion on the side of the open end.

In this configuration, the end part of one of the metallic pipes is formed as an expanded-diameter connecting part as described above. The expanded-diameter connecting part has a larger inner diameter than the adjacent part which continues from the expanded-diameter connecting part. Therefore, stress concentration is likely to occur at the base end of the expanded-diameter connecting part. In addition, a fragile intermetallic compound layer is created at a boundary between the different metals (a boundary between the first metal and the second metal).

In consideration thereof, in this configuration, a thickness of the intermetallic compound layer is set smaller at the end portion on the side of the base end than the end portion on the side of the open end. Accordingly, even if stress concentration occurs at the base end of the expanded-diameter connecting part, since the intermetallic compound layer has a small thickness at the end portion on the side of the base end, a deterioration in durability (in particular, peeling strength) due to the stress can be suppressed. In addition, in this configuration, since a deterioration in durability is suppressed by controlling the thickness of the intermetallic compound layer as described above, there is no need to use a stainless-steel joint or the like as was conventional. Therefore, according to the present configuration, a deterioration in reliability of a joint portion between metallic pipes can be suppressed while suppressing an increase in cost.

For the joint structure for metallic pipes described above, a configuration can be exemplified in which the thickness of the intermetallic compound layer gradually decreases as extending from the end portion on the side of the open end toward the end portion on the side of the base end. In this case, an abrupt variation of the thickness of the intermetallic compound layer is suppressed and the thickness gradually varies between the end portion on the side of the open end and the end portion on the side of the base end. Accordingly, a deterioration in durability due to stress can be further suppressed.

In the joint structure for metallic pipes described above, the thickness of the intermetallic compound layer is favorably 75 μm or less. In this case, particularly superior reliability of the joint portion between the metallic pipes can be achieved.

In the joint structure for metallic pipes described above, favorably, the first metallic pipe is an aluminum pipe and the second metallic pipe is a copper pipe. The present invention is effective since a Cu—Al metallic pipe compound is likely to be created at an interface of copper and aluminum and a deterioration of strength tends to occur due to the Cu—Al metallic pipe compound.

In the joint structure for metallic pipes described above, favorably, the expanded-diameter connecting part of the one metallic pipe may have a flared shape. In the case of a flared expanded-diameter connecting part, the present invention is effective since stress concentration is likely to occur at a base end of the flared shape.

Furthermore, for the joint structure for metallic pipes described above, a mode may be adopted in which an inner diameter of the expanded-diameter connecting part is greater than the inner diameter of the adjacent part and an outer diameter of the expanded-diameter connecting part is equal to an outer diameter of the adjacent part. In the case of this mode, since the expanded-diameter connecting part and the adjacent part are connected to each other without a variation in outer diameter, a degree of stress concentration at the base end of the expanded-diameter connecting part can be reduced in comparison to the mode with the flared shape described above.

Moreover, the present invention is not limited to the embodiment described above, and various modifications, improvements, and the like can be made without departing from the spirit and scope of the present invention.

For example, while a case where the thickness of the intermetallic compound layer 15 gradually decreases as extending from the end portion 15a on the side of the open end 13a toward the end portion 15b on the side of the base end 13b has been exemplified in the embodiment described above, the present invention is not limited thereto. For example, a mode may be adopted in which the thickness of the intermetallic compound layer 15 is locally reduced at the end portion 15a and a vicinity thereof on the side of the base end 13b where stress concentration is likely to occur. In addition, a mode can also be exemplified where the thickness of the intermetallic compound layer 15 gradually decreases as extending from the end portion 15a on the side of the open end 13a toward the end portion 15b on the side of the base end 13b and the thickness of the intermetallic compound layer 15 remains approximately constant between a certain midway point and the end portion 15b on the side of the base end 13b.

Furthermore, while an example of a joint structure between the aluminum pipe 11 and the copper pipe 12 has been described in the embodiment above, the present invention is not limited thereto. The present invention can be applied to other joint structures in which an intermetallic compound layer is formed by joining of different metals.

In addition, while an example of a case where an Al—Si brazing filler metal is used as a brazing filler metal has been described in the embodiment above, the present invention is not limited thereto. Other brazing filler metals such as an Al—Zn brazing filler metal or an Al—Si—Zn brazing filler metal can also be used.

Furthermore, while an example of a case where a ringed brazing filler metal is used as a brazing filler metal during brazing has been described in the embodiment above, the present invention is not limited thereto. For example, a sheet-like brazing filler metal may be arranged between metallic pipes, a brazing filler metal may be applied to one of or both of the metallic pipes, or a brazing filler metal may be injected into a gap between the metallic pipes.

EXPLANATION OF REFERENCE NUMERALS 11 aluminum pipe
12 copper pipe
13 expanded-diameter connecting part
13a open end
13b base end
14 brazing filler metal
15 intermetallic compound layer
15a end portion on side of open end
15b end portion on side of base end
16 adjacent part
M1 first metal
M2 second metal

The invention claimed is:

1. A joint structure for metallic pipes comprising:
a first metallic pipe made of a material containing one of a first metal element and a second metal element different from the first metal element as a main component; and
a second metallic pipe made of a material containing the other of the first metal element and the second metal element as a main component, wherein
the first metallic pipe includes an expanded-diameter connecting part at an end part of the first metallic pipe, an inner diameter of the end part being greater than an inner diameter of an adjacent part adjacent to the end part,
the second metallic pipe includes a connecting end part at one end part of the second metallic pipe, the connecting end part lying in the expanded-diameter connecting part from an open end of the expanded-diameter connecting part to a base end of the expanded-diameter connecting part,
a brazing filler layer lies between an outer surface of the connecting end part of the second metallic pipe and an inner surface of the expanded-diameter connecting part, and is made of a material containing the first metal element or the second metal element as a main component,
an intermetallic compound layer lies at an interface of the first metal element and the second metal element located between the brazing filler layer and the first metallic pipe or the second metallic pipe, and is made of a material containing both the first metal element and the second metal element, and the intermetallic compound layer has a smaller thickness at a leading end of the connecting end part of the second metallic pipe than at a leading end of the expanded-diameter connecting part of the first metallic pipe,
the thickness of the intermetallic compound layer varies from the leading end of the expanded diameter connecting part of the first metallic pipe to the leading end of the connecting end part of the second metallic pipe, without increasing the thickness of the intermetallic compound layer.

2. The joint structure for metallic pipes according to claim 1, wherein the thickness of the intermetallic compound layer gradually decreases as extending from the leading end of the expanded-diameter connecting part of the first metallic pipe toward the leading end of the connecting end part of the second metallic pipe.

3. The joint structure for metallic pipes according to claim 1, wherein the thickness of the intermetallic compound layer is 75 μm or less.

4. The joint structure for metallic pipes according to claim 1, wherein the first metallic pipe is an aluminum pipe and the second metallic pipe is a copper pipe.

5. The joint structure for metallic pipes according to claim 1, wherein the expanded-diameter connecting part of the first metallic pipe has a flared shape.

6. The joint structure for metallic pipes according to claim 1, wherein an inner diameter of the expanded-diameter connecting part is greater than the inner diameter of the adjacent part and an outer diameter of the expanded-diameter connecting part is equal to an outer diameter of the adjacent part.

* * * * *